United States Patent
Jang et al.

(10) Patent No.: US 12,061,396 B2
(45) Date of Patent: Aug. 13, 2024

(54) DISPLAY DEVICE

(71) Applicant: SAMSUNG ELECTRONICS CO., LTD., Suwon-si (KR)

(72) Inventors: Naewon Jang, Suwon-si (KR); Youngchol Lee, Suwon-si (KR); Hyungsuk Kim, Suwon-si (KR); Seokwoo Yong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/120,003

(22) Filed: Mar. 10, 2023

(65) Prior Publication Data

US 2023/0221598 A1 Jul. 13, 2023

Related U.S. Application Data

(63) Continuation of application No. PCT/KR2021/011728, filed on Sep. 1, 2021.

(30) Foreign Application Priority Data

Oct. 12, 2020 (KR) .......................... 10-2020-0130878

(51) Int. Cl.
*G02F 1/1335* (2006.01)
*G02F 1/13357* (2006.01)

(52) U.S. Cl.
CPC .. *G02F 1/133614* (2021.01); *G02F 1/133603* (2013.01); *G02F 1/133605* (2013.01);
(Continued)

(58) Field of Classification Search
None
See application file for complete search history.

(56) References Cited

U.S. PATENT DOCUMENTS 8,324,001 B2 12/2012 Kim
8,558,448 B2 10/2013 Harada
(Continued)

FOREIGN PATENT DOCUMENTS

JP 2008-047493 2/2008
JP 4123057 7/2008
(Continued)

OTHER PUBLICATIONS

International Search Report for PCT/KR2021/011728 mailed Jan. 24, 2022, 4 pages.
(Continued)

*Primary Examiner* — Richard H Kim
(74) *Attorney, Agent, or Firm* — Nixon & Vanderhye P.C.

(57) ABSTRACT

A display device may have a reduced thickness while having enhanced color reproducibility by having an improved structure. The display device may include: a liquid crystal panel; a light source plate which is arranged at the rear of the liquid crystal panel to provide light to the liquid crystal panel, and which includes a printed circuit board and an LED chip mounted on the printed circuit board; and a chip cover which is provided to cover a light-emitting surface of the LED chip, and which changes the wavelength of the light emitted from the LED chip, wherein the chip cover includes: a cover layer having a first surface arranged to face the light-emitting surface of the LED chip, a second surface opposite to the first surface, and an accommodating groove provided on the second surface; a light conversion member which changes the wavelength of the light emitted from the LED chip, and which is accommodated in the accommodating groove; and a barrier layer for covering the second surface to cover the light conversion member from the outside.

16 Claims, 10 Drawing Sheets

(52) U.S. Cl.
CPC .. *G02F 1/133608* (2013.01); *G02F 1/133621* (2013.01); *G02F 2201/346* (2013.01); *G02F 2202/28* (2013.01); *G02F 2202/36* (2013.01)

(56) References Cited

U.S. PATENT DOCUMENTS

| | | | |
|---|---|---|---|
| 9,159,874 | B2 | 10/2015 | Kim et al. |
| 9,366,398 | B2 | 6/2016 | Jang et al. |
| 10,401,557 | B2 | 9/2019 | Kim et al. |
| 11,043,618 | B2 | 6/2021 | Pickett et al. |
| 2013/0207237 | A1 | 8/2013 | Weisbuch et al. |
| 2015/0108491 | A1 | 4/2015 | Lu |
| 2016/0005922 | A1 | 1/2016 | Huang et al. |
| 2017/0244008 | A1 | 8/2017 | Kwon et al. |
| 2018/0108491 | A1 | 4/2018 | Xu |
| 2020/0013932 | A1 | 1/2020 | Moon et al. |
| 2021/0273024 | A1* | 9/2021 | Wang ................ G02F 1/133606 |
| 2021/0341666 | A1* | 11/2021 | Lu ..................... G02B 6/0021 |

FOREIGN PATENT DOCUMENTS

| | | |
|---|---|---|
| JP | 2011-057506 | 3/2011 |
| JP | 4866003 | 11/2011 |
| JP | 5635832 | 12/2014 |
| JP | 2015-82657 | 4/2015 |
| JP | 2016-18989 | 2/2016 |
| KR | 10-2011-0130851 | 12/2011 |
| KR | 10-2012-0078883 | 7/2012 |
| KR | 10-2013-0052944 | 5/2013 |
| KR | 10-2016-0141302 | 12/2016 |
| KR | 10-2017-0066782 | 6/2017 |
| KR | 10-1751685 | 6/2017 |
| KR | 10-1762223 | 7/2017 |
| KR | 10-1774204 | 9/2017 |
| KR | 10-2018-0072798 | 6/2018 |
| KR | 10-2018-0086840 | 8/2018 |
| KR | 10-2019-0139636 | 12/2019 |
| KR | 10-2085912 | 3/2020 |
| KR | 10-2131599 | 7/2020 |
| WO | 2018/084289 | 5/2018 |

OTHER PUBLICATIONS

Written Opinion of the ISA for PCT/KR2021/011728 mailed Jan. 24, 2022, 4 pages.

* cited by examiner

DISPLAY DEVICE

CROSS REFERENCE TO RELATED APPLICATIONS

This application is a continuation of International Application No. PCT/KR2021/011728 filed on 1 Sep. 2021, designating the United States, in the Korean Intellectual Property Receiving Office, and claiming priority to Korean Patent Application No. KR 10-2020-0130878, filed Oct. 12, 2020, the disclosures of which are all hereby incorporated by reference herein in their entireties.

BACKGROUND

Field

Certain example embodiments relate to a display device having a backlight unit.

Description of Related Art

A display device is an output apparatus which is capable of visually displaying data information, such as characters, figures, etc., and images, and includes televisions, various monitors, various portable terminals (e.g., laptop computers, tablet personal computers (PCs) and smartphones), and the like.

Display devices are classified into an emissive type that uses a self-emissive display panel, such as organic light emitting diodes (OLEDs), and a non-emissive type that uses a display panel unable to emit light by itself and requiring light from a backlight unit, such as a liquid crystal display (LCD) panel.

Backlight units are classified based on the position of a light source into a direct type with light sources positioned behind a display panel and an edge type with light sources positioned along edges of a display panel. A direct type backlight unit may include a light source plate with light emitting diodes (LEDs) mounted on, directly or indirectly, a plate-shaped printed circuit board (PCB).

A recent display device may include a lens provided to cover a light source to widen an optical diffusion area of light emitted from the light source. However, due to the expansion of the optical diffusion area through the lens, the number of local dimming blocks is reduced, which is a limitation in improving the contrast ratio.

In addition, recent display devices may improve color reproducibility of light emitted from a light source through quantum dots (QDs). Conventionally, this has been implemented through a QD sheet provided at the rear of the display panel, but due to the quantum dot sheet, the thickness of the display device may increase.

SUMMARY

An example embodiment may provide a display device of which the structure is improved to thereby increase the number of local dimming blocks and/or improve the contrast ratio.

An example embodiment may provide a display device of which the structure is improved to reduce the thickness.

An example embodiment may provide a display device in which color reproducibility may be maintained with less amount of quantum dot conversion members compared to when using a quantum dot sheet.

In an example embodiment, a display device may include: a liquid crystal panel; a light source plate disposed at a rear side of the liquid crystal panel to provide light to the liquid crystal panel and including a printed circuit board (PCB) and a light emitting diode (LED) chip mounted on, directly or indirectly, the PCB; and a chip cover provided to cover a light emitting surface of the LED chip and configured to convert a wavelength of light emitted from the LED chip, wherein the chip cover includes: a cover layer including a first surface disposed to face the light emitting surface of the LED chip, a second surface opposite to the first surface, and an accommodating groove provided on the second surface; a light conversion member, including light conversion material, configured to convert a wavelength of light emitted from the LED chip, light conversion member accommodated in the accommodating groove; and a barrier layer covering the second surface to cover the light conversion member from an outside.

The light conversion material may include quantum dot particles for converting a wavelength of light emitted from the LED chip.

The LED chip may be provided to emit blue-based light.

The light conversion member may include a red quantum dot for converting blue-based light into red-based light and a green quantum dot for converting blue-based light into green-based light.

The chip cover may further include a Distributed Bragg reflector (DBR) layer configured to transmit long-wavelength based light and reflect short-wavelength based light to improve light conversion efficiency of the light conversion member.

The DBR layer may be disposed on the barrier layer.

The cover layer may be provided in a size equal to or larger than the light emitting surface of the LED chip to cover the entire light emitting surface of the LED chip.

The cover layer may include glass.

The light conversion member may be accommodated in the accommodating groove by dispensing in the accommodating groove.

The light conversion member may be blocked from being exposed to the outside by the cover layer forming the accommodating groove and the barrier layer covering the accommodating groove.

When the accommodating groove is a first accommodating groove, the cover layer may further include a second accommodating groove provided on, directly or indirectly, the second surface to be spaced apart from the first accommodating groove.

When the LED chip is a first LED chip, the light source plate may further include a second LED chip mounted on, directly or indirectly, the PCB to be spaced apart from the first LED chip.

When the chip cover is a first chip cover, the first chip cover is provided to cover the first LED chip, the display device may further include a second chip cover provided to cover the second LED chip.

The light source plate may further include a reflective sheet including a through hole, into which the chip cover is inserted, and provided to cover the mounting surface.

The chip cover may further include an adhesive layer provided between the first surface and the light emitting surface to bond the cover layer to the light emitting surface of the LED chip.

The LED chip may be mounted on, directly or indirectly, the mounting surface in a chip on board (COB) method or a surface mounting technology (SMT) method.

In an example embodiment, a display device may include: a liquid crystal panel; a light source plate disposed at a rear side of the liquid crystal panel to provide light to the liquid crystal panel and including a printed circuit board (PCB) having a mounting surface and a plurality of light emitting diode (LED) chips mounted on, directly or indirectly, the mounting surface of the PCB; and a plurality of chip covers corresponding to the plurality of LED chips, respectively, and provided to cover the plurality of LED chips, respectively, wherein the plurality of chip covers include: a plurality of cover layers each of which is provided to cover a corresponding one of the plurality of LED chips and includes an accommodating groove; a plurality of light conversion members each of which is configured to convert a wavelength of light emitted from the LED chip and is accommodated in the accommodating groove of a corresponding one of the plurality of cover layers; and a plurality of Distributed Bragg reflector (DBR) layers each of which covers one surface of a corresponding one of the plurality of cover layers to prevent or reduce the light conversion member from being exposed to an outside and is configured to reflect short-wavelength based light, among the light emitted from the plurality of LED chips, and transmit long-wavelength based light.

The plurality of light conversion members may include quantum dot particles for converting a wavelength of light emitted from the LED chip.

The plurality of chip covers may further include a barrier layer disposed between the plurality of cover layers and the plurality of DBR layers.

The plurality of light conversion members may be accommodated in the accommodating grooves of the plurality of cover layers, respectively, by dispensing in the plurality of accommodating grooves.

In an example embodiment, a display device may include: a liquid crystal panel; a light source plate disposed at a rear side of the liquid crystal panel to provide light to the liquid crystal panel and including a printed circuit board (PCB) having a mounting surface and a plurality of light emitting diode (LED) chips mounted on, directly or indirectly, the mounting surface of the PCB in a matrix form; and a plurality of chip covers coupled to the plurality of LED chips, respectively, wherein the plurality of chip covers include: a plurality of cover layers each of which is provided to cover a corresponding one of the plurality of LED chips and includes an accommodating groove; a plurality of light conversion members each of which is configured to convert a wavelength of light emitted from the LED chip and is accommodated in the accommodating groove of a corresponding one of the plurality of cover layers; and a plurality of barrier layers provided to one surface of a corresponding one of the plurality of cover layers to prevent or reduce the light conversion member from being exposed to an outside.

In an example embodiment, a display device of which the structure is improved to thereby increase the number of local dimming blocks and improve the contrast ratio can be provided.

In an example embodiment of the disclosure, a display device in which color reproducibility is maintained with less amount of quantum dot conversion members compared to when using a quantum dot sheet can be provided.

In an example embodiment, a light conversion member containing quantum dots to improve color reproducibility is provided on, directly or indirectly, a light source plate so that a quantum dot sheet is not included in the display device, through which slimness of the display device can be achieved.

BRIEF DESCRIPTION OF DRAWINGS

The foregoing and other features of example embodiments will become more apparent from the following detailed description of embodiments when read in conjunction with the accompanying drawings. In the drawings, like reference numerals refer to like elements.

DETAILED DESCRIPTION

The embodiments described in the present specification are only examples of preferred embodiments of the present disclosure, and various modifications may be made at the time of filing of the present disclosure to replace the embodiments and drawings of the present specification.

The singular form is intended to include the plural form as well, unless the context clearly indicates otherwise. In the accompanying drawings, the size and relative sizes of elements may be exaggerated for clarity and/or descriptive purposes.

It need to be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

Figure 1:
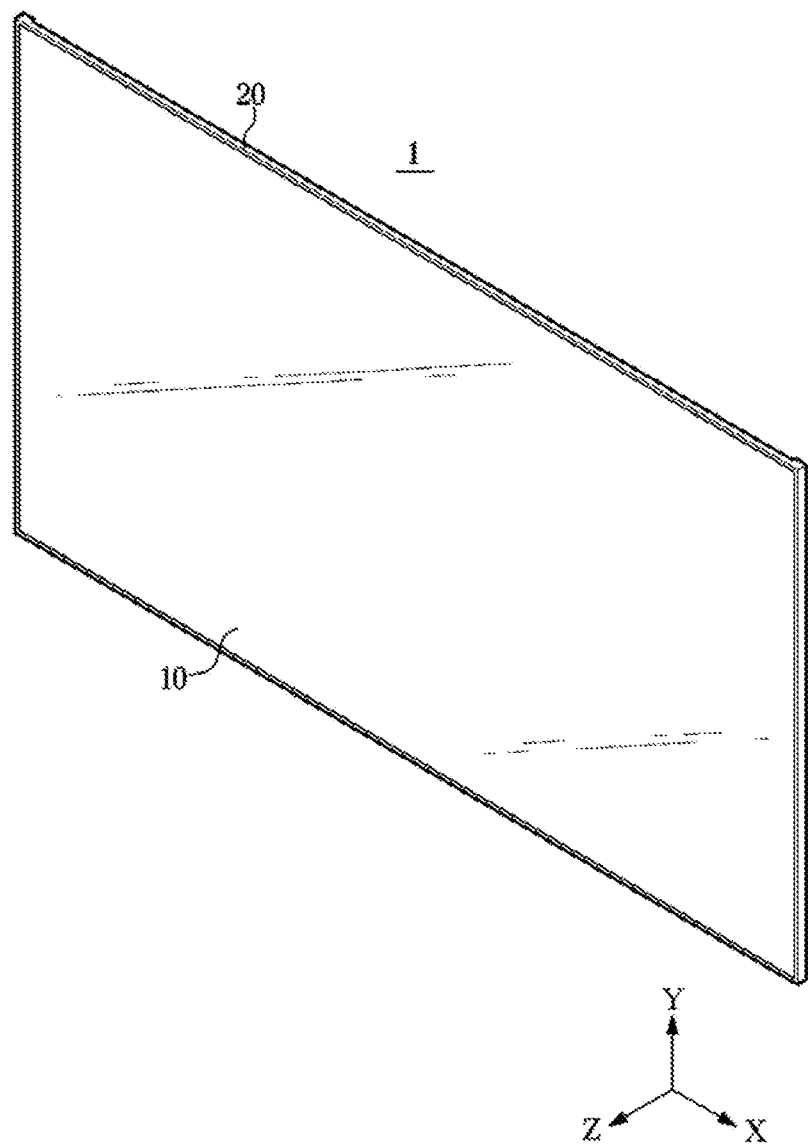
FIG. 1 is a perspective view illustrating a display device according to an example embodiment.

In FIG. 1, the X-axis, Y-axis, and Z-axis directions perpendicular to each other are illustrated, the X-axis direction represents the direction of a long side 11 of a liquid crystal panel 10, the Y-axis direction represents the direction of a short side 12 of the liquid crystal panel 10, and the Z-axis direction represents the front-back direction.

Hereinafter, preferred example embodiments will be described in detail with reference to the accompanying drawings.

Figure 2:
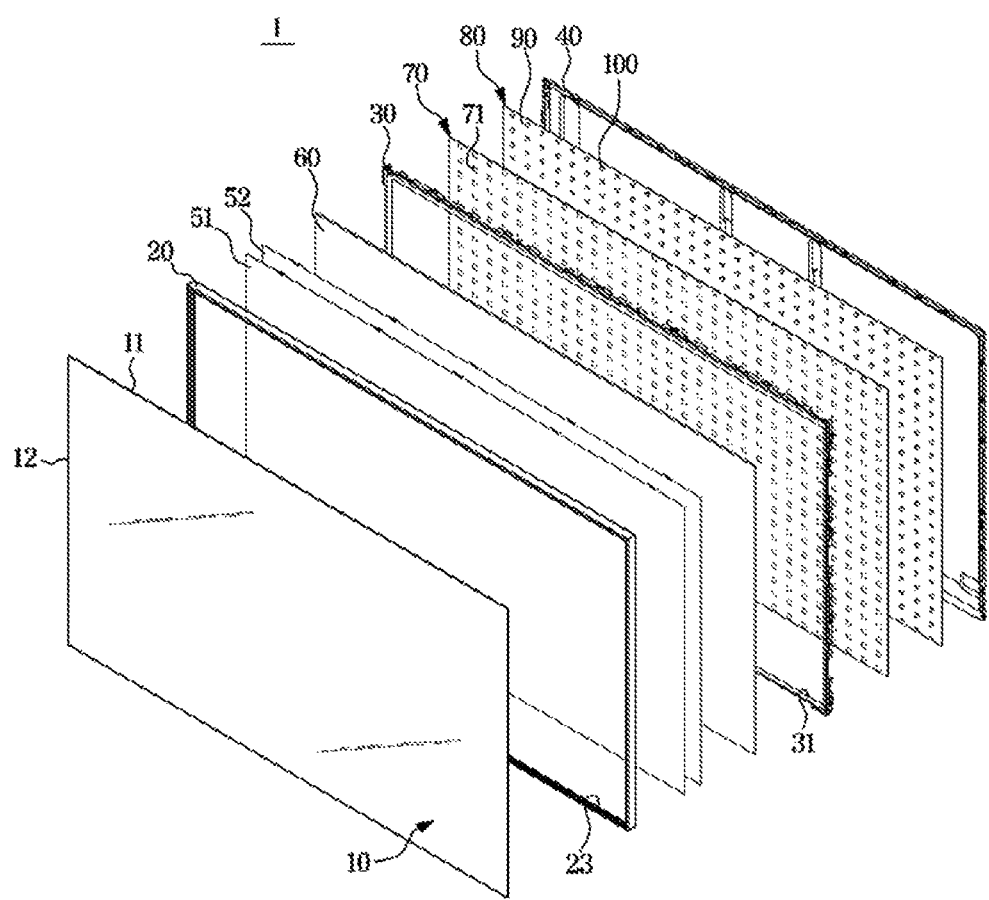
FIG. 2 is an exploded perspective view illustrating a display device according to an example embodiment.
Figure 3:
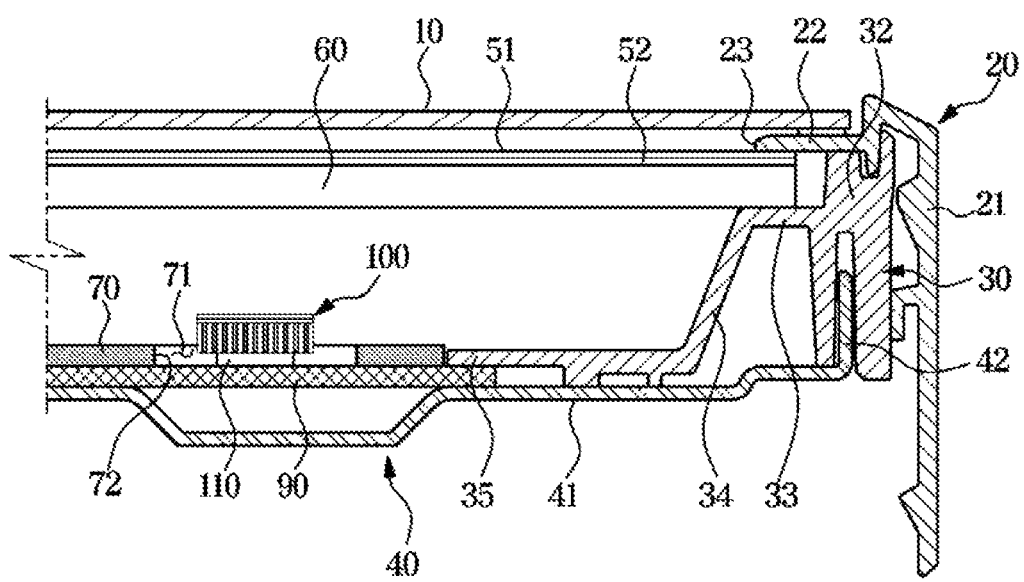
FIG. 3 is a cross-sectional view illustrating a display device according to an example embodiment.
Figure 4:
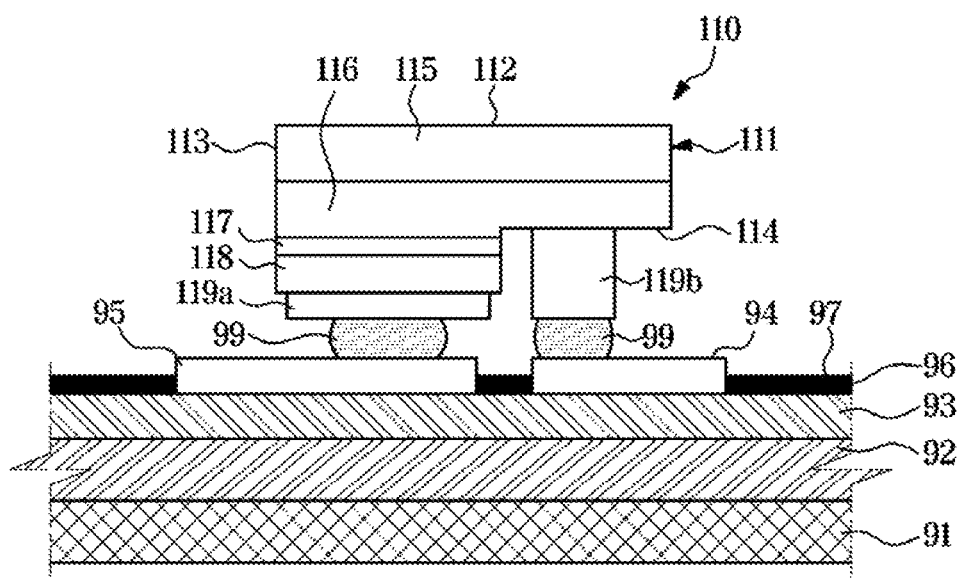
FIG. 4 is a cross-sectional view illustrating a structure in which a light emitting diode (LED) chip of a display device is mounted on a printed circuit board (PCB) according to an example embodiment.

FIG. 1 is a perspective view illustrating a display device according to an example embodiment. FIG. 2 is an exploded perspective view illustrating a display device according to an example embodiment. FIG. 3 is a cross-sectional view illustrating a display device according to an example embodiment. FIG. 4 is a cross-sectional view illustrating a structure in which a light emitting diode (LED) chip of a display device is mounted on, directly or indirectly, a printed circuit board (PCB) according to an example embodiment;

Referring to FIGS. 1 to 4, a display device 1 includes a liquid crystal panel 10 for displaying an image, a backlight unit disposed behind the liquid crystal panel 10 to provide light to the liquid crystal panel 10, and a chassis assembly supporting the backlight unit and the liquid crystal panel 10.

The chassis assembly includes a rear chassis 40 provided to support the backlight unit, a front chassis 20 provided in front of the rear chassis 40 to support the liquid crystal panel 10, and a middle mold 30 coupled between the front chassis 20 and the rear chassis 40.

The liquid crystal panel 10 may include a thin film transistor substrate in which thin film transistors are provided in the form of a matrix, a color filter substrate coupled to the thin film transistor substrate in parallel with the thin transistor substrate, and liquid crystal injected between the TFT substrate and the color filter substrate and having optical properties varied based on a change in voltage or temperature.

The backlight unit may be disposed behind the liquid crystal panel 10 to transmit light to the liquid crystal panel 10. The backlight unit may include a light source plate 80 including a printed circuit board 90 on which light emitting diode (LED) chips, which are light sources 110, are mounted and optical members arranged along a path of the light emitted from the light source plate 80.

The light source plate 80 may have a flat panel shape. The light source plate 80 may be disposed in parallel with the liquid crystal panel 10.

The light source plate 80 may include a printed circuit board 90, a plurality of LED chips 110 mounted on, directly or indirectly, a surface facing the liquid crystal panel 10 of the printed circuit board 90, and a plurality of chip covers 100 each of which is formed to cover a corresponding one of the plurality of LED chips 110 to protect the LED chip 110 and increase light efficiency. Each of the plurality of chip covers 100 may be provided to correspond to each of the LED chips 110.

According to an example embodiment, each of the plurality of chip covers 100 may include a cover layer 120 provided to cover the LED chip 110, a light conversion member 130 accommodated into an accommodating groove 123 of the cover layer 120, a barrier layer 140 disposed on the cover layer 120, and a Distributed Bragg reflector (DBR) layer 150 disposed on the barrier layer 140. Details of the plurality of chip covers 100 will be described below.

The optical members may be disposed on a movement path of the light emitted from the LED chips 110 to guide the traveling direction of the light, reflect the light, diffuse the light, or improve optical characteristics.

The optical members may include a reflector sheet 70 for reflecting light to prevent or reduce light loss, a diffuser plate 60 for evenly diffusing irregular light emitted from the light source plate 80, and optical sheets 51 and 52 for enhancing optical characteristics.

The reflector sheet 70 may reflect light emitted from the light source plate 80 or light exiting the diffuser plate 60 backward to be directed to the diffuser plate 60. The reflector sheet 70 may be disposed in front of the light source plate 80 while in close contact with the light source plate 80.

The reflector sheet 70 may have openings 91 formed at positions corresponding to the plurality of LED chips 110. Each of the plurality of LED chips 110 may be disposed inside a corresponding one of the openings 71. Each of the plurality of LED chips 110 may be disposed at a distance away from an inner circumferential surface 72 of the corresponding opening 71. Accordingly, the light emitted from the plurality of LED chips 110 is prevented or reduced from being blocked by the inner circumferential surface 72 of the opening 71 and the beam angle may be increased.

Meanwhile, according to an example embodiment, the opening 71 of the reflector sheet 70 may be provided in a quadrangular shape to correspond to the shape of the chip cover 100. However, it is not limited thereto, and the opening of the reflective sheet may be provided in a circular shape.

The diffuser plate 60 may uniformly diffuse the light emitted from the light source plate 80 and support the optical sheets 51 and 52. The diffuser plate 60 may uniformly diffuse the light incident onto an incident surface thereof and exit the light through an exit surface thereof.

The optical sheets 51 and 52 may be disposed in front of the diffuser plate 60 to improve optical characteristics of light exiting the diffuser plate 60. The optical sheets 51 and 52 may include a diffuser sheet for offsetting a pattern of the diffuser plate 60, a prism sheet for improving brightness by concentrating light, a protection sheet for protecting other optical sheets against an external shock or inflow of foreign materials, a reflective polarizing sheet (e.g., a dual brightness enhancement film (DBEF)) for transmitting one polarization while reflecting another polarization to enhance brightness, and the like.

The rear chassis 40 may be arranged behind the backlight unit. The rear chassis 40 may have a plate shape that is bent approximately at a rim portion. The backlight unit may be accommodated between the rear chassis 40 and the front chassis 20.

The rear chassis 40 may include a rear base portion 41 on which the light source plate 80 is installed and rear-side portions 42 formed on the upper, lower, left and right edges of the rear chassis 40 to be coupled to the middle mold 30.

The rear chassis 40 may serve to dissipate heat generated from a heating element, such as the plurality of LED chips 110, and the like to the outside. To this end, the rear chassis 40 may be formed of aluminum, various types of metals, such as stainless steel, or plastics such as acrylonitrile butadiene styrene (ABS).

The front chassis 20 may be provided in a frame shape having an opening 23 that allows light from the backlight unit to be provided to the liquid crystal panel 10. The front chassis 20 may include a front-side portion 21 formed on the upper, lower, left and right edges of the front chassis 20 to be coupled to the middle mold 30 and a panel support portion 22 protruding inward from the front-side portion 21 to support the liquid crystal panel 10.

The middle mold 30 may support the diffuser plate 60 and reflect light emitted from the light source plate 80 to the diffuser plate 60. The middle mold 30 may maintain a distance between the diffuser plate 60 and the light source plate 80. The middle mold 30 may be coupled between the front chassis 20 and the rear chassis 40.

The middle mold 30 may be provided in a frame shape having an opening 31. The middle mold 30 may include a frame portion 32 to which the front chassis 20 and the rear chassis 40 are coupled, a diffuser plate support portion 33 protruding inward from the frame portion 32 to support the diffuser plate 60, a reflector portion 34 extending from the diffuser plate support portion 33 to reflect light, and a board support portion 35 extending from the reflector portion 34 to support a printed circuit board 90.

The frame portion 32 may be disposed on upper, lower, left, and right edges of the middle mold 30. The frame portion 32 may be coupled to the front chassis 20 and the rear chassis 40 in various known fitting structures and with separate fastening members.

The diffuser plate support portion 33 may protrude inward from the frame portion 32 to support the diffuser plate 60. The diffuser plate support portion 33 may support edges of the incident surface of the diffuser plate 60. The diffuser plate support portion 33 may be formed in parallel with the base portion 41 of the rear chassis 40.

The reflector portion 34 may reflect the light emitted from the light source plate 80 to the incident surface of the diffuser plate 44. The reflector portion 34 may extend obliquely inward from the diffuser plate support portion 33. The reflector portion 34 may obliquely extend from the diffuser plate support portion 33 toward the board support portion 35.

The board support portion 35 may fix the printed circuit board 90 of the light source plate 80 not to be lifted from the base portion 41 of the rear chassis 40. The board support portion 35 may be formed at an inner end portion of the reflector portion 34. The edge of the printed circuit board 90 of the light source plate 80 may be supported between the board support portion 35 and the base portion 41.

The frame portion 32, the diffuser plate support portion 33, the reflector portion 34, and the board support portion 35 of the middle mold 30 may be integrally formed with each other. A highly reflective material may be coated on the surface of the middle mold 30. The highly reflective material may be coated on the entire surface of the middle mold 30, or may be coated only on the surface of the reflector portion 34. The entire area or the reflector portion 34 of the middle mold 30 may have a white color to effectively reflect light.

The printed circuit board 90 of the light source plate 80 may include a base 91, a power wiring layer 93 including a metal wiring (not shown), an insulation layer 92 formed between the base 91 and the power wiring layer 93, and a photo solder resist (PSR) layer 96 formed on the power wiring layer 93 to protect the pattern of the power wiring layer 93 and enhance light efficiency.

The base 91 may be provided using any type of substrate as long as it can form the frame of the light source plate 80 and apply a voltage to the LED chip 110 through the power wiring layer 93. For example, the base 91 may be formed of FR-4, ceramic, polyimide, polyethylene terephthalate (PET), glass, or the like.

The metal wiring of the power wiring layer 93 may be formed by patterning a conductive material on the base 91.

The insulation layer 92 may be positioned between the base 91 and the power wiring layer 93 to electrically insulate between the base 91 and the metal wiring of the power wiring layer 93.

The PSR layer 96 may be formed by applying a photo solder resist (PSR) ink on the power wiring layer 93.

A plurality of LED chips 110 may be mounted on, directly or indirectly, the printed circuit board 90. The plurality of LED chips 110 may be mounted to have a predetermined distance from each other. The plurality of LED chips 110 may be mounted in a matrix form on the printed circuit board 90.

The printed circuit board 90 may include a mounting surface 97 which forms the uppermost surface and on which the plurality of LED chips 110 are mounted. The PSR layer 96 may form a part of the mounting surface 97.

Since the plurality of LED chips 110 are each formed in the same form, the following description is made in relation to a single LED chip 110.

The LED chip 110 may not only be provided as an LED of a general size, but may also be provided as a mini LED having a size of several hundreds of μm or a micro LED having a size of several μm to several tens of μm.

The LED chip 110 may be provided to emit blue-based light. The LED chip 110 may be formed as at least one of a blue quantum dot (Blue QD)-based electroluminescent device, a blue fluorescent-based electroluminescent device, a blue thermally activated delayed fluorescent-based electroluminescent device, and a blue phosphorescent-based electroluminescent device. Details thereof will be described below.

The LED chip 110 may be directly mounted on the printed circuit board 90 in a Chip On Board (COB) method. However, it is not limited thereto. The LED chip 110 may be mounted in a surface mounting technology (SMT) method rather than a chip-on-board method.

In an example embodiment, a larger number of LED chips may be included compared to the conventional light source plate including a lens. The distance between the plurality of LED chips is reduced, and the number of LED chips mounted on, directly or indirectly, the same area may be greatly increased thereby. Local dimming refers to a function of turning on/off some LED chips among a plurality of LED chips. Through this, when expressing black that does not require a backlight, the black may be implemented to be close to real black by turning off some LED chips. Each of the plurality of LED chips may form one local dimming block. Accordingly, as the number of LED chips increases, the number of local dimming blocks increases. As the number of local dimming blocks increases, the contrast ratio may be improved. Therefore, according to the aspect of the disclosure, the number of local dimming blocks of the display device may increases and the contrast ratio may be improved.

According to an example embodiment, the LED chip 110 may be an inorganic light emitting device. The inorganic light emitting devices may be manufactured by growing a thin film of inorganic materials, such as aluminum (AL), gallium (Ga), nitrogen (N), phosphorus (P), arsenic (As), or indium (In) on a sapphire, gallium arsenide (GaAs) or silicon (Si)-based base substrate.

The LED chip 110 may be picked up from the base substrate and directly transferred onto the printed circuit board 90. The LED chip 110 may be picked up and transported through an electrostatic method using an electrostatic head or a bonding method using an elastic polymer material having elasticity, such as Polydimethylsiloxane (PDMS) or silicon, as a head.

The LED chip 110 may be a flip chip type LED including: a device body 111 having a light emitting surface 112 forming the upper surface and through which light emitted from the LED chip 110 is emitted, at least one side surface 113, and a bottom surface 114; and device electrodes 119a and 119b formed on the bottom surface 114 of the device body 111. The LED chip 110 may have a substantially hexahedral shape, and the at least one side surface 103 may include four side surfaces.

Such a flip-chip type LED may be directly mounted on the printed circuit board 90 through the device electrodes 119a and 119b formed on the bottom surface 114 without a separate connection structure, such as a metal lead or a wire. Accordingly, the efficiency of the manufacturing process is high and there is a benefit in the miniaturization and weight reduction of the LED chip 110. In addition, since the device electrodes 119a and 119b are positioned on a side in a direction opposite to the light emission direction of the LED chip 110, the light emission efficiency of the LED 100 may be improved.

However, unlike the embodiment, the LED chip 110 may be provided using a lateral chip type LED in which device electrodes are spaced apart from each other and two wires are required, or a vertical chip type LED in which device electrodes are disposed to vertically overlap each other and one wire is required.

The LED chip 110 may include a growth substrate 115, an n-type semiconductor layer 116, an active layer 117, a p-type semiconductor layer 118, an n-type device electrode 119b, and a p-type device electrode 119a.

The growth substrate 115 may be provided using a sapphire substrate that is useful as a substrate for nitride semiconductor growth, but is not limited thereto, and may be provided using various substrates provided for semiconductor single crystal growth, such as a silicon substrate, a GaN substrate, and the like.

The N-type semiconductor layer 116, the active layer 117, and the p-type semiconductor layer 118 may be formed of a nitride semiconductor. The active layer 117 may serve as a light emitting layer that emits light at a magnitude corresponding to the band gap energy thereof by recombination of electrons and holes.

The N-type device electrode 119b and the P-type device electrode 119a may be formed of a material capable of ohmic contact with a nitride semiconductor, for example, may be formed of a metal, such as silver (Ag) or aluminum (Al).

The printed circuit board 90 may have an n-type substrate electrode 94 and a p-type substrate electrode 95 to correspond to the n-type device electrode 119b and the p-type device electrode 119a, respectively. The n-type device electrode 119b and the p-type device electrode 119a may be electrically connected to the n-type substrate electrode 94 and the p-type substrate electrode 95, respectively, by solder bumps 99.

However, unlike the embodiment, the n-type device electrode 119b and the p-type device electrode 119a may be electrically connected, directly or indirectly, to the n-type substrate electrode 94 and the p-type substrate electrode 95 by an anisotropic conductive film. The anisotropic conductive film is a film having a structure in which conductive balls are dispersed in an adhesive resin, and when pressure is applied to the conductive balls, a thin insulating film surrounding the conductive spheres is broken and the conductive spheres allow the electrodes to be electrically connected.

Hereinafter, the plurality of chip covers 100 according to an example embodiment will be described in detail.

Figure 5:
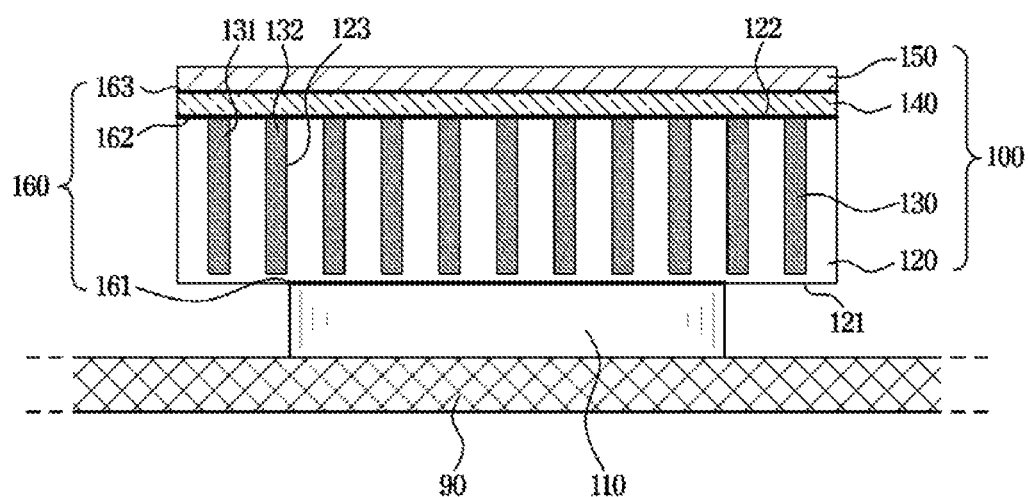
FIG. 5 is an enlarged cross-sectional view illustrating a partial configuration of a light source plate of a display device according to an example embodiment.

FIG. 5 is an enlarged cross-sectional view illustrating a partial configuration of a light source plate of a display device according to an example embodiment.

In the case of a conventional display device, a quantum dot sheet for changing the wavelength of light emitted from the light source is included to improve color reproducibility of the light emitted from the light source.

The quantum dot sheet is disposed to have a predetermined distance from the light source inside the display device to be prevented, or likelihood reduced, from being thermally deformed due to heat generated from the light source, and is disposed together with an additional protective film to prevent or reduce moisture from penetrating from the outside.

Accordingly, the color reproducibility of the display device is increased and the performance of the display device is improved, but the thickness of the display device increases according to the arrangement of the quantum dot sheet inside the display device, and the quantum dot sheet and the protective film of the quantum dot sheet cause the production cost to rise.

In order to resolve the above issue, a display device including a light source in which a configuration having quantum dots is directly installed on an LED package instead of using a quantum dot sheet has been developed. However, as the configuration having quantum dots is installed on the LED package, there is another issue that heat generated from the LED chip and external moisture may lower the reliability of the configuration having quantum dots.

The display device 1 according to an example embodiment may, in order to resolve the above-described issue, include a configuration capable of improving reliability of a configuration having quantum dots against heat and moisture, without having a quantum dot sheet.

In detail, the light source plate 80 may include a plurality of chip covers 100 each of which is provided to cover a corresponding one of the plurality of LED chips 110. The plurality of chip covers 100 may include: a plurality of cover layer 120 each of which is bonded to a corresponding one of the plurality of LED chips 110 to cover the light emitting surface 112 of the LED chips 100; a plurality of light conversion member 130 each of which is accommodated in the accommodating groove 123 formed in the cover layer 120 by dispensing in the accommodating groove 123 and is configured to convert a wavelength of light emitted from the LED chip 110; and a plurality of barrier layer 140 each of which is provided to cover one surface of the cover layer 120 having the accommodating groove 123 to protect the light conversion member 130 from the outside.

In addition, according to an example embodiment, the plurality of chip covers 100 may further include a plurality of DBR layers 150 provided to cover the plurality of barrier layers 140.

In addition, according to an example embodiment, the light source plate 80 may include an adhesive layer 160 provided to bond the LED chip 110, the cover layer 120, the barrier layer 140, and the DBR layer 150.

Since the plurality of cover layers 120, the plurality of light conversion members 130, the plurality of barrier layers 140, and the plurality of DBR layers 150 are each provided in the same form, they will be referred to as the cover layer 120, the light conversion member 130, the barrier layer 140, and the DBR layer 150 for the sake of convenience of description.

The cover layer 120 may be provided to cover the light emitting surface 112 of the LED chip 110. Hereinafter, the upper and lower direction will be referred to with reference to FIG. 5.

The cover layer 120 may be formed by cutting plate-shaped glass. The cover layer 120 may be provided in a substantially rectangular plate shape. The cover layer 120 may be provided to cover the entire light emitting surface 112 of the LED chip 110. To this end, the size of the cover layer 120 may be larger than or equal to the size of the light emitting surface 112 of the LED chip 110, but is not limited thereto, and the size of the cover layer may be smaller than the size of the light emitting surface of the LED chip. However, when the size of the cover layer is larger than or equal to the size of the light emitting surface of the LED chip, the color reproduction of light may be further improved.

The cover layer 120 may include a first surface 121 disposed to face the light emitting surface 112 of the LED chip 110 and a second surface 122 opposite to the first surface. The second surface 122 may be disposed to face a rear surface of the liquid crystal panel 10. The cover layer 120 may be attached to the LED chip 110 by an adhesive applied on the first surface 121 or the light emitting surface 112. The adhesive may include an adhesive resin in a liquid state, and it may be applied in a liquid state and then cured so that the first surface 121 and the light emitting surface 112 may be bonded to each other. The type of adhesive is not limited.

A first adhesive layer 161 may be provided between the cover layer 120 and the LED chip 110. The first adhesive layer 161 may be provided to bond the cover layer 120 to the LED chip 110.

The cover layer 120 may include the accommodating groove 123 formed on the second surface 122. The accommodating groove 123 may be formed as a portion of the second surface 122 of the cover layer 120 being recessed inward. The accommodating groove 123 may be formed in the shape of a quadrangular pillar or, alternatively, may be formed in the shape of a cylinder. The shape of the accommodating groove 123 is not particularly limited. However, the accommodating groove 123 is formed as a portion of the second surface 122 being recessed inward, and the accommodating groove 123 does not pass through the first surface 121. Accordingly, only a portion of the accommodating groove 123 formed on the second surface 122 may be exposed to the outside in an example embodiment.

The light conversion member 130 may include quantum dots. The light conversion member 130 may be accommodated in the accommodating groove 123. The light conversion member 130 may be accommodated in the accommodating groove 123 by dispensing a resin having a plurality of quantum dots into the accommodating groove 123. The light conversion member 130 dispensed in the accommodating groove 123 may be cured into a solid.

The plurality of quantum dots included in the light conversion member 130 may convert the wavelength of a portion of blue-based light emitted from the LED chip 110 to a mixed light of green-based light and red-based light or a yellow-based light (wavelength shift).

A quantum dot refers to a semiconductor crystal formed by gathering hundreds to thousands of atoms. The size of the quantum dots may be, for example, between several nanometers and several tens of nanometers. As such, since the quantum dot has a very small size, a quantum confinement effect occurs. The quantum confinement effect is that when a particle is very small, electrons in the particle form a discontinuous energy state by the outer wall of the particle, and as the space within the particle is smaller, the energy state of electrons become higher and the energy band gap become wider. According to the quantum confinement effect, quantum dots, when irradiated with light such as ultraviolet light or visible light, generate light of various wavelengths. In this case, the quantum dots scatter the incident light to emit light.

The length of the wavelength of light generated from the quantum dots may depend on the size of the particle. Specifically, when light having a wavelength greater than the energy band gap is incident onto the quantum dot, the quantum dot is excited by absorbing the energy of the light, and then transits to a ground state while emitting light of a specific wavelength. In this case, as the size of the quantum dot is smaller, light of a shorter wavelength, for example, blue-based light or green-based light may be generated, and as the size of the quantum dot is larger, light of a longer wavelength, for example, red-based light may be generated. Therefore, light of various colors may be implemented according to the size of the quantum dot.

When a quantum dot particle capable of emitting green-based light according to incidence of light is referred to as a green quantum dot, and a quantum dot particle capable of emitting red-based light according to incidence of light is referred to as a red quantum dot, a plurality of quantum dots may include a green quantum dot and a red quantum dot.

As blue light collides with the green quantum dots and the red quantum dots, the blue light may be converted into a mixed light of green-based light and a red-based light, or a yellow light.

The yellow light may pass through the light conversion member 130 and then proceed to the liquid crystal panel 10.

In addition, another portion of the blue light emitted from the LED chip 110 may not collide with the plurality of quantum dots disposed on the light conversion member 130 but may pass through the light conversion member 130 while remaining in a state of blue-based light.

Accordingly, a white light, that is, a mixture of the blue-based light and the yellow-based light, which has the wavelength converted, may pass through the light conversion member 130 and proceed to the liquid crystal panel 10. Accordingly, light having an improved color reproducibility may be transmitted to the liquid crystal panel 10 without an additional configuration of a quantum dot sheet.

On the second surface 122 of the cover layer 120, the barrier layer 140 provided to cover the second surface 122 of the cover layer 120 to protect the light conversion member 130 from the outside may be disposed The barrier layer 140 may be bonded to the cover layer 120 by an adhesive applied between the barrier layer 140 and the second surface 122 of the cover layer 120. The barrier layer 140 may be provided in a size corresponding to that of the cover layer 120.

Between the barrier layer 140 and the cover layer 120, a second adhesive layer 162 may be provided. The second adhesive layer 162 may be provided to bond the barrier layer 140 to the cover layer 120.

As the barrier layer 140 covers the second surface 122 of the cover layer 120, the open upper side of the accommodating groove 123 may be covered by the barrier layer 140. The accommodating groove 123 may be formed such that an upper side thereof, which is to be covered by the barrier layer 140, is opened and a lower side and a lateral side thereof are covered by the cover layer 120. Accordingly, the light conversion member 130 dispensed and accommodated in the accommodating groove 123 may be blocked from being exposed to the outside in response to the barrier layer 140 covering the second surface 122 of the cover layer 120. Through this, the light conversion member 130, which is vulnerable to moisture, may be prevented or reduced from being exposed to external moisture. In other words, the barrier layer 140 may prevent or reduce the light conversion member 130 from being exposed to the outside to protect the light conversion member 130 from external moisture.

As described above, the conventional technology includes, in order to improve color reproducibility of light emitted from the light source, a quantum dot sheet for converting a wavelength of light emitted from a light source, and in order to prevent or reduce moisture from penetrating into the quantum dot sheet, an additional protective film is disposed together with the quantum dot sheet. The quantum dot sheet is disposed together with the optical sheets, and the thickness of the display device is increased due to the quantum dot sheet.

According to the aspect of the disclosure, the display device 1 may not include a quantum dot sheet, and thus not include an additional protective film disposed together with the quantum dot sheet to protect the quantum dot sheet. Accordingly, the thickness of the display device, which has increased due to the arrangement of the quantum dot sheet and the additional protective film, may be be reduced. That is, the display device may be slimmed down. In other words, since the light conversion member 130 for improving the color reproduction of light generated from the LED chip 110, together with the barrier layer 140 for protecting the light conversion member 130 is separately provided on, directly or indirectly, the light source plate 80, the thickness of the display device 1 may be reduced. In addition, since the light conversion member 130 may be blocked from being exposed to the outside by the cover layer 120 and the barrier layer 140, the light conversion member 130 may be prevented or reduced from having thermal deformation due to high heat generated in the LED chip 110. Through this, durability of the display device 1 may be improved.

In addition, in the conventional technology, a quantum dot sheet having quantum dots needs to be provided in a size corresponding to that of the printed circuit board. Therefore, as the size of the liquid crystal panel increases, the size of the quantum dot sheet increases proportionally, and also the size of the additional protective film increases, resulting in increasing production cost.

According to the aspect of the disclosure, the display device 1 may include the plurality of chip covers 100 each of which is provided to cover a corresponding one of the plurality of LED chips 110, and each of the plurality of chip covers 100 may include the conversion member 130. The light conversion member 130 may be provided to be accommodated in the accommodating groove 123 formed in the cover layer 120. With such a structure, the light conversion members 130 may be arranged to correspond to the plurality of LED chips 110, respectively. Since the plurality of light conversion members 130 are provided to correspond to the plurality of LED chips 110, additional light conversion members may not be disposed in a space between the plurality of LED chips 110. Accordingly, the amount of use of the light conversion member having quantum dots may be significantly reduced compared to when using a quantum dot sheet. As the amount of use of the light conversion member is reduced, the production cost may be reduced.

The accommodating groove 123 may, for example, be provided only one in each cover layer 120, and as shown in the drawing, may be provided in plural in one cover layer 120. The plurality of accommodating grooves 130 may be spaced apart from each other in a direction parallel to the first surface 121 or the second surface 122 of the cover layer 120.

As shown in FIG. 5, as the plurality of accommodating grooves 123 are formed in one cover layer 120, the production efficiency of the chip cover 100 may be improved.

Specifically, according to an example embodiment, the cover layer 120, the light conversion member 130 accommodated in the accommodating groove 123 of the cover layer 120, the barrier layer 140 covering the cover layer 120, and the DBR layer 150 covering the barrier layer 140 may be manufactured in a large scale, and they may be cut to produce each of the chip covers 100. In this case, in order to minimize or reduce the light conversion member 130 from being exposed to the outside even when they are cut into various sizes, a single cover layer 120 may be provided to include a plurality of accommodating grooves 123.

In other words, by reducing the size of one accommodating groove 123, even when one of the plurality of accommodating grooves 123 is cut away when manufacturing the chip covers 100, the light conversion member may be minimally deformed due to the cutting. Even when the accommodating groove 123 is cut in the manufacturing process of the chip cover 100 and the light conversion member is exposed to the outside, since the size of the accommodating groove 123 is small and the amount of the light conversion member 130 accommodated in the accommodating groove 123 is small, the amount of the light conversion member 130 exposed to the outside is insufficient although exposed to the outside. Accordingly, the resulting degradation of light conversion efficiency may be minimized or reduced. When manufacturing the chip cover 100, the chip cover 100 may be manufactured in various sizes without considering the size of one chip cover 100 manufactured by cutting, so that the production efficiency of the chip cover 100 may be improved. Furthermore, productivity of the display device 1 may be improved.

The accommodating groove 123 may be provided such that the remaining sides except for the upper side thereof, which is opened for dispensing of the light conversion member 130, are covered by the cover layer 120. Therefore, the remaining except for an upper side, of the light conversion member 130 accommodated in the accommodating groove 123 may be prevented or reduced from a contact with outside.

When the accommodating grooves 123 is provided in plural, the light conversion member 130 may be provided in plural so as to be accommodated in the accommodating grooves 123, respectively. For example, the light conversion member 130 may include a first light conversion member 131 and a second light conversion member 132 disposed side by side.

According to an example embodiment, the light source plate 80 may include a DBR layer 150 disposed on, directly or indirectly, the barrier layer 140 to improve conversion efficiency of light emitted from the light emitting surface 112. In the same manner that the barrier layer 140 is attached to the cover layer 120, the DBR 150 may be attached to the barrier layer 140 by an adhesive disposed between at least the barrier layer 140 and the DBR layer 150.

A third adhesive layer 163 may be provided between at least the DBR layer 150 and the barrier layer 140. The third adhesive layer 163 may be provided to bond the DBR layer 150 to the barrier layer 140.

The DBR layer 150 may include a plurality of overlapping thin films. At least two thin films among the plurality of overlapping thin films may have different refractive indices. The DBR layer 150 may improve the conversion efficiency of light emitted from the light emitting surface 112 and passed through the cover layer 120, the light conversion member 130, the light conversion member 130, and the barrier layer 140.

Specifically, the DBR layer 150 may transmit long-wavelength light toward the liquid crystal panel 10 and reflect short-wavelength light toward the printed circuit board 90. Accordingly, the DBR layer 150 may transmit green-based light and red-based light and reflect blue-based light. However, the DBR layer 150 may not reflect all of the blue-based light so that some of the blue-based light may be transmitted toward the liquid crystal panel 10. The blue-based light reflected by the DBR layer 150 may return to the PCB 90 in a state of being converted into red-based light or green-based light by colliding with a plurality of quantum dots included in the light conversion member 130, or in a state of not being converted. The light reflected by the DBR layer 150 may be reflected again by the PSR layer 96 on the printed circuit board 90 and pass through the cover layer 120, the light conversion member 130, the barrier layer 140, and the DBR layer, to thereby be incident to the liquid crystal panel 10. In this process, light conversion may be performed again by the light conversion member 130. Part of the blue-based light reflected back from the DBR layer 150 may repeat the above process. Through the above process, light emitted from the LED chip 110 may pass through the light conversion member 130 several times, by which the amount of light converted into red-based light or green-based light may be increased. In other words, light conversion efficiency may be improved.

In addition, as the light emitted from the light emitting surface 112 passes through the plurality of thin films of the DBR layer 150, the light beam angle with respect to the liquid crystal panel 10 may be increased. The DBR layer 150 may improve the light conversion efficiency of the light emitted from the light emitting surface 112 and increase the beam angle of the light with respect to the liquid crystal panel 10. The DBR layer may include multi-layers having different refractive indices.

Figure 6:
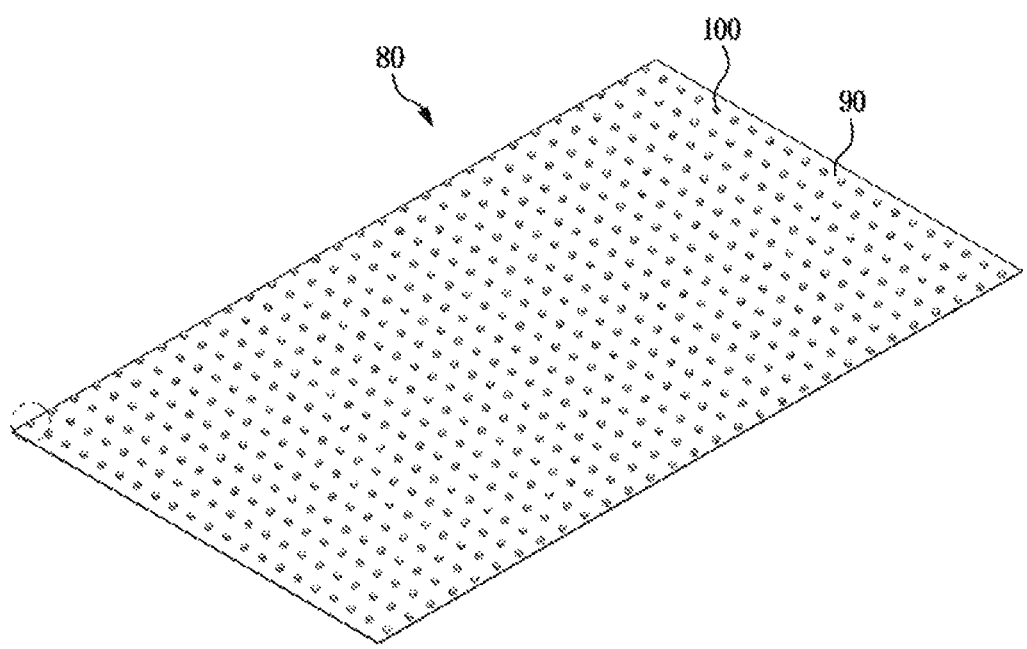
FIG. 6 is a view separately illustrating a light source plate of a display device according to an example embodiment.
Figure 7:
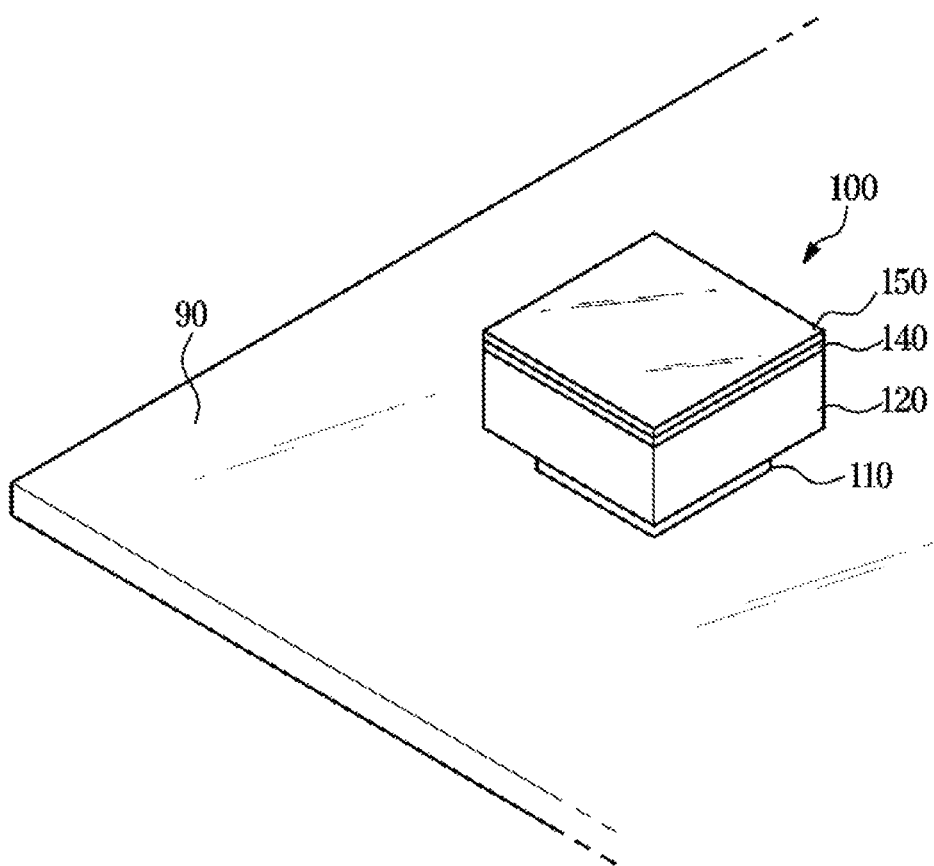
FIG. 7 is an enlarged cross-sectional view illustrating a part of the light source plate shown in FIG. 6.
Figure 8:
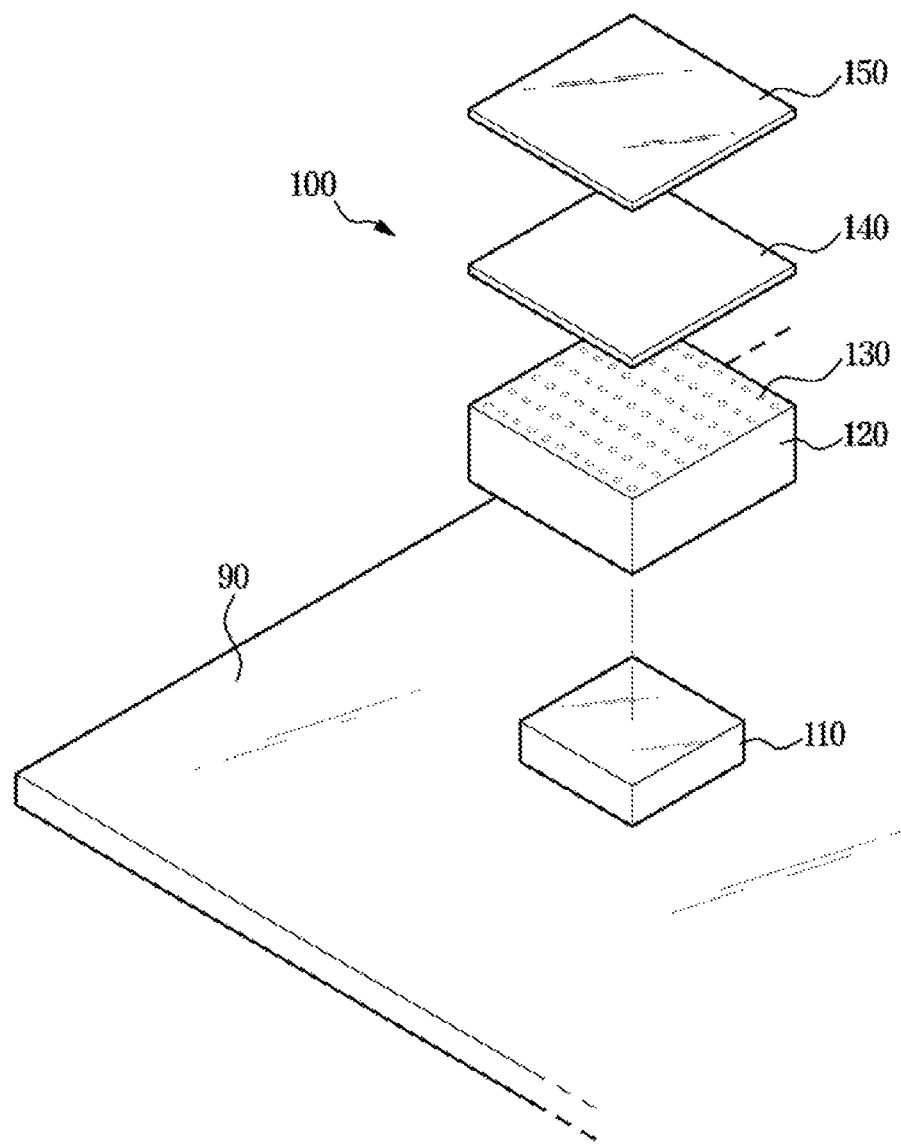
FIG. 8 is a view illustrating the light source plate shown in FIG. 7, in which a chip cover is disassembled.

FIG. 6 is a view separately illustrating a light source plate of a display device according to an example embodiment. FIG. 7 is an enlarged cross-sectional view illustrating a part of the light source plate shown in FIG. 6. FIG. 8 is a view illustrating the light source plate shown in FIG. 7, in which a chip cover is disassembled.

Hereinafter, a method of manufacturing a display device 1 according to an example embodiment will be briefly described.

First, a PCB 90 is prepared.

Next, a plurality of LED chips 110 are mounted on, directly or indirectly, the PCB 90 in a COB method or a SMT method.

Next, a chip cover 100 is attached to each of the plurality of LED chips 110. A method of attaching the chip cover 100 to the LED chip 110 is not limited. For example, as described above, an adhesive resin in a liquid state may be applied to the upper surface of the LED chip 110 or the lower surface of the chip cover 100 and then cured for the chip cover 100 to be attached to the LED chip 110.

The chip cover 100 may be prepared before being attached to the LED chip 110. The chip cover 100 may include a cover layer 120 formed of glass, a light conversion member 130 dispensed and accommodated in an accommodating groove 123 formed in the cover layer 120, a barrier layer 140 covering the upper surface of the cover layer 120, and a DBR layer 150 covering the upper surface of the barrier layer 140. Alternatively, as will be described below, the chip cover 200 may be configured such that the barrier layer is omitted from the above configuration and the DBR layer covers the cover layer. In addition, the DBR layer of the chip cover 300 may be omitted in the above configuration.

Figure 9:
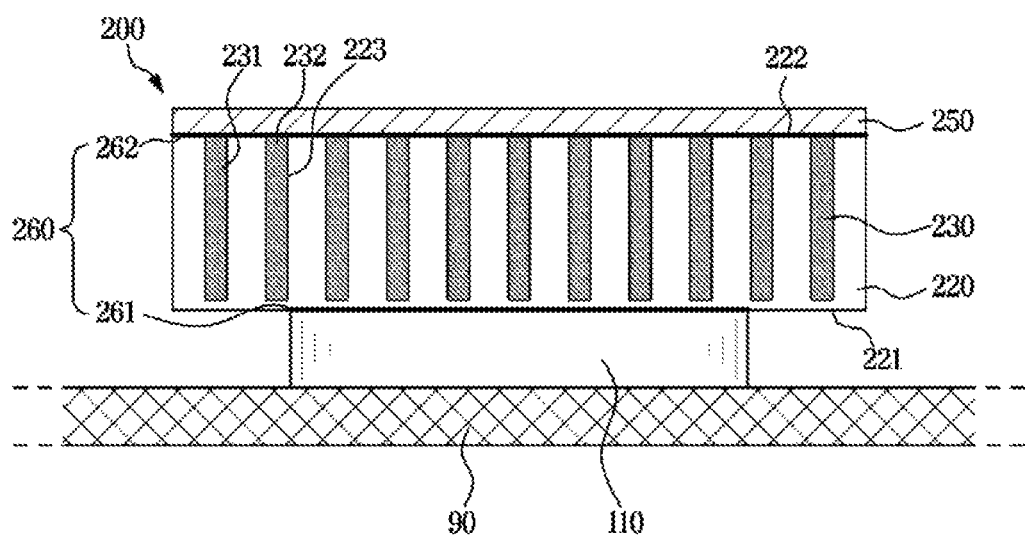
FIG. 9 is an enlarged cross-sectional view illustrating a partial configuration of a light source plate of a display device according to another example embodiment.

FIG. 9 is an enlarged cross-sectional view illustrating a partial configuration of a light source plate of a display device according to another embodiment of the disclosure.

Hereinafter, a chip cover 200 according to another embodiment of the disclosure will be described in detail with reference to FIG. 9. Since other configurations except for the chip cover 200 are the same as those described above, the same descriptions will be omitted.

According to the another embodiment of the disclosure, the chip cover 200 may include a cover layer 220 formed of glass and provided to cover a light emitting surface of an LED chip 110, a light conversion member 230 dispensed and accommodated in an accommodating groove 223 formed in the cover layer 220, and a DBR layer 250 provided to cover an upper surface of the cover layer 220. In addition, the chip cover 200 may include an adhesive layer 260 provided to bond the LED chip 110, the cover layer 220, and the DBR layer 250.

The cover layer 220 may be bonded to the LED chip 110. To this end, a first adhesive layer 261 may be provided between the cover layer 220 and the LED chip 110.

The accommodating groove 223 may be provided, for example, only one in each cover layer 220, and as shown in the drawing, may be provided in plural in one cover layer 220. The plurality of accommodating grooves 230 may be spaced apart from each other along a direction parallel to an upper surface or a lower surface of the cover layer 220. The lower surface and the upper surface of the cover layer 220 are referred to as a first surface 221 and a second surface 222 of the cover layer 220, respectively.

The accommodating groove 223 may be provided such that the remaining sides except for an upper side, which is opened for dispensing of the light conversion member 230, are covered by the cover layer 220. Therefore, the remaining, except for an upper side, of the light conversion member 230 accommodated in the accommodating groove 223 may be blocked from a contact with outside.

When the accommodating grooves 223 is provided in plural, the light conversion member 230 may be provided in plural to be accommodated in the accommodating grooves 223, respectively. For example, the light conversion member 230 may include a first light conversion member 231 and a second light conversion member 232 disposed side by side.

According to the another embodiment of the disclosure, the DBR layer 250 may be provided to cover the second surface 222 of the cover layer 220. The DBR layer 250 may be bonded to the cover layer 220. To this end, a second adhesive layer 262 may be provided between the DBR layer 250 and the cover layer 220.

The DBR layer 250 may transmit long-wavelength light, among the light incident to the DBR layer 250, toward the liquid crystal panel 10 and reflect short-wavelength light toward the printed circuit board 90. Accordingly, the DBR layer 250 may transmit green-based light and red-based light and reflect blue-based light. The DBR layer 250 may reflect part of the blue-based light incident to the DBR layer 250, and the reflected blue-based light may be transmitted through the light conversion member 230 again, in which process, the blue-based light may be converted into red-based light or green-based light. Accordingly, light conversion efficiency may be improved.

The DBR layer 250 may cover the second surface 222 of the cover layer 220 to block the light conversion member 230 from being exposed to the outside. As described above, since the remaining sides except for the open upper side of the accommodating groove 223 are covered by the cover layer 220, when the DBR layer 250 covers the second surface 222 of the cover layer 220, which corresponds to the open upper side of the accommodating groove 223, the entire area of the accommodating groove 223 may be covered. Accordingly, the light conversion member 230 accommodated in the accommodating groove 223 may be blocked from a contact with the outside. Since the light conversion member 230 vulnerable to moisture and heat is blocked from being exposed to the outside, deformation of the light conversion member 230 may be prevented or reduced. Through this, durability of the display device 1 may be improved.

Figure 10:
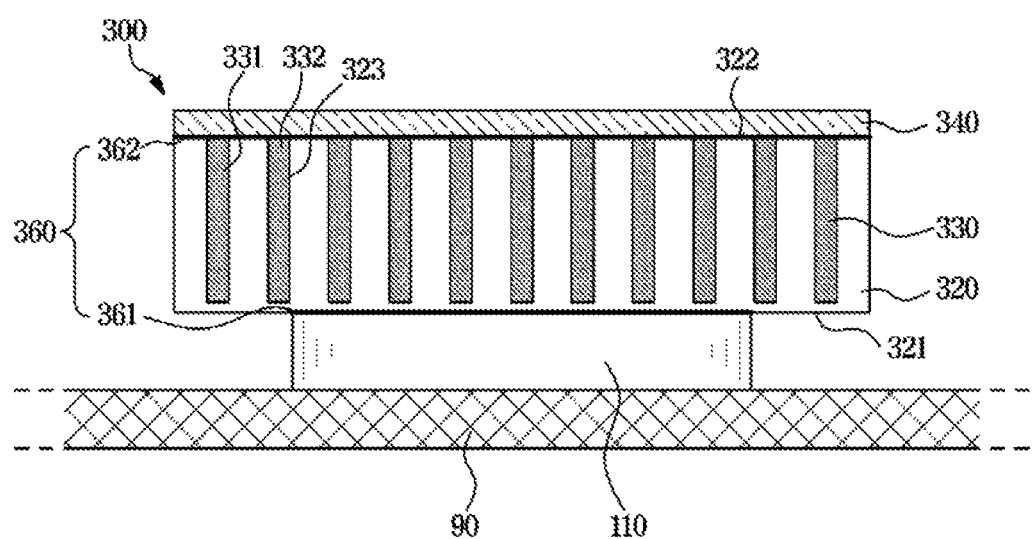
FIG. 10 is an enlarged cross-sectional view illustrating a partial configuration of a light source plate of a display device according to still another embodiment.

FIG. 10 is an enlarged cross-sectional view illustrating a partial configuration of a light source plate of a display device according to still another embodiment of the disclosure.

Hereinafter, a chip cover 300 according to another embodiment of the disclosure will be described in detail with reference to FIG. 10. Since other configurations except for the chip cover 300 are the same as those described above, the same descriptions will be omitted.

According to the another embodiment of the disclosure, the chip cover 300 may include a cover layer 320 formed of glass and provided to cover a light emitting surface of an LED chip 110, a light conversion member 330 dispensed and accommodated in an accommodating groove 323 formed in the cover layer 320, and a barrier layer 340 provided to cover an upper surface of the cover layer 320. In addition, the chip cover 300 may include an adhesive layer 360 provided to bond the LED chip 110, the cover layer 320, and the barrier layer 340.

The cover layer 320 may be bonded to the LED chip 110. To this end, a first adhesive layer 361 may be provided between the cover layer 320 and the LED chip 110.

The accommodating groove 323 may be provided, for example, only one in each cover layer 320, and as shown in the drawing, may be provided in plural in one cover layer 320. The plurality of accommodating grooves 330 may be spaced apart from each other along a direction parallel to an upper surface or a lower surface of the cover layer 320. The lower surface and the upper surface of the cover layer 320 are referred to as a first surface 321 and a second surface 322 of the cover layer 320, respectively.

The accommodating groove 323 may be provided such that the remaining sides except for an upper side, which is opened for dispensing of the light conversion member 330, are covered by the cover layer 320. Therefore, the remaining, except for an upper side, of the light conversion member 330 accommodated in the accommodating groove 323 may be blocked from a contact with outside.

When the accommodating groove 323 is provided in plural, the light conversion member 330 may be provided in plural to be accommodated in the accommodating grooves 323, respectively. For example, the light conversion member 330 may include a first light conversion member 331 and a second light conversion member 332 disposed side by side.

According to the another embodiment of the disclosure, the barrier layer 340 may be provided to cover the second surface 322 of the cover layer 320. The barrier layer 340 may be bonded to the cover layer 320. To this end, a second adhesive layer 362 may be provided between the barrier layer 340 and the cover layer 320.

The barrier layer 340 may cover the second surface 322 of the cover layer 320 to block the light conversion member 330 from being exposed to the outside. As described above, since the remaining sides except for the open upper side of the accommodating groove 323 are covered by the cover layer 320, when the barrier layer 340 covers the second surface 322 of the cover layer 320, which corresponds to the open upper side of the accommodating groove 323, the entire area of the accommodating groove 323 may be covered. Accordingly, the light conversion member 330 accommodated in the accommodating groove 323 may be blocked from a contact with the outside. Since the light conversion member 330 vulnerable to moisture and heat is blocked from being exposed to the outside, deformation of the light conversion member 330 may be prevented or reduced. Through this, durability of the display device 1 may be improved.

Although the disclosure has been shown and described in relation to specific embodiments, it would be appreciated by those skilled in the art that changes and modifications may be made in these embodiments without departing from the principles and scope, the scope of which is defined in the claims and their equivalents. While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. A display device comprising:
   a liquid crystal panel;
   a light source plate disposed rearwardly of the liquid crystal panel to provide light to the liquid crystal panel and including a printed circuit board (PCB) and a plurality of light emitting diode (LED) chips mounted on the PCB; and
   a plurality of chip covers each of which is provided to cover a light emitting surface of a corresponding one of the plurality of LED chips and configured to convert a wavelength of light emitted from the plurality of LED chip,
   wherein each of the plurality of chip covers includes:
      a cover layer including a first surface disposed to face the light emitting surface of the corresponding LED chip, a second surface opposite to the first surface, and a plurality of accommodating grooves recessed into the cover layer from the second surface toward the first surface and spaced apart from each other in a direction parallel to the first surface or the second surface;
      a light conversion member, comprising light conversion material, configured to convert a wavelength of light emitted from the LED chip, the light conversion member accommodated at least partially in the plurality of accommodating grooves; and
      a barrier layer at least partially covering the second surface so as to cover the light conversion member from an outside.

2. The display device of claim 1, wherein the light conversion material includes quantum dot particles for converting a wavelength of light emitted from the LED chip.

3. The display device of claim 2, wherein the LED chip is configured to emit blue-based light,
   wherein the light conversion material includes a red quantum dot for converting blue-based light into red-based light, and a green quantum dot for converting blue-based light into green-based light.

4. The display device of claim 1, wherein the chip cover further includes a Distributed Bragg reflector (DBR) layer configured to transmit long-wavelength based light and reflect short-wavelength based light, to improve light conversion efficiency of the light conversion member.

5. The display device of claim 4, wherein the DBR layer is disposed on the barrier layer.

6. The display device of claim 1, wherein the cover layer is provided in a size equal to or larger than the light emitting surface of the LED chip to cover the entire light emitting surface of the LED chip.

7. The display device of claim 6, wherein the cover layer includes glass.

8. The display device of claim 1, wherein the light conversion member is accommodated in the plurality of accommodating grooves by dispensing in the plurality of accommodating grooves.

9. The display device of claim 1, wherein the light conversion member is blocked from being exposed to the outside by at least the cover layer forming the plurality of accommodating grooves and the barrier layer covering the plurality of accommodating grooves.

10. The display device of claim 1, wherein the plurality of accommodating groove do not pass through the first surface.

11. The display device of claim 1, wherein the LED chip is a first LED chip, and
the light source plate further includes a second LED chip mounted on the PCB to be spaced apart from the first LED chip.

12. The display device of claim 11, wherein the chip cover is a first chip cover, and the first chip cover is provided to cover the first LED chip,
the display device further comprising a second chip cover provided to cover the second LED chip.

13. The display device of claim 1, wherein the light source plate comprises a reflective sheet including a through hole, into which the chip cover is inserted, and provided to at least partially cover the mounting surface.

14. The display device of claim 1, wherein the chip cover further includes an adhesive layer provided between at least the first surface and the light emitting surface to bond the cover layer to the light emitting surface of the LED chip.

15. The display device of claim 1, wherein the LED chip is mounted on the mounting surface in a chip on board (COB) method or a surface mounting technology (SMT) method.

16. The display device of claim 1, wherein the plurality of accommodating grooves overlap the LED chip.

* * * * *